Figure 8A:
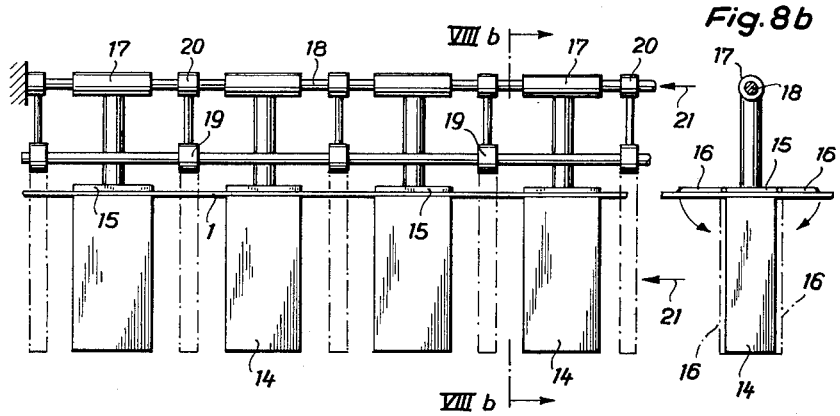

July 3, 1962  KARL-HEINZ DANIELZIG  3,041,941
MANUFACTURE OF CONTAINERS OR THE LIKE
Filed July 23, 1958  12 Sheets-Sheet 1
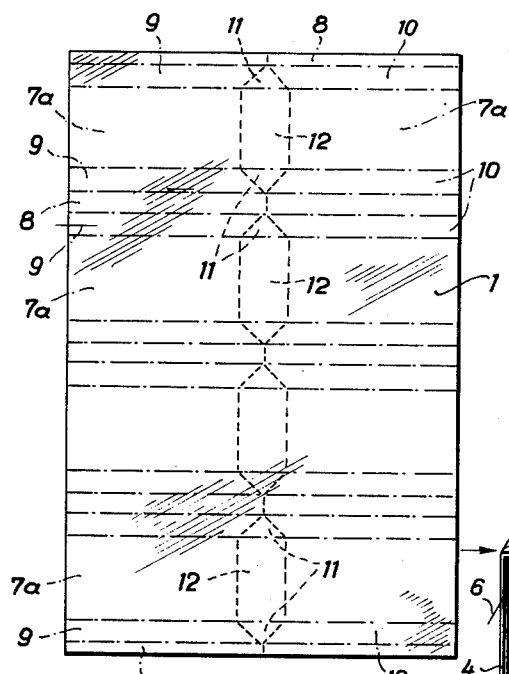
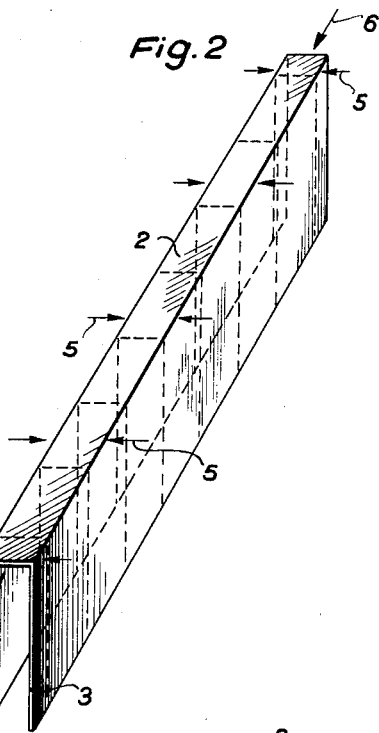
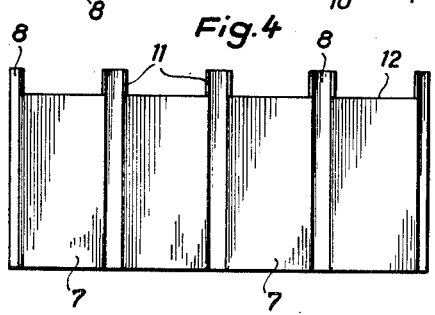
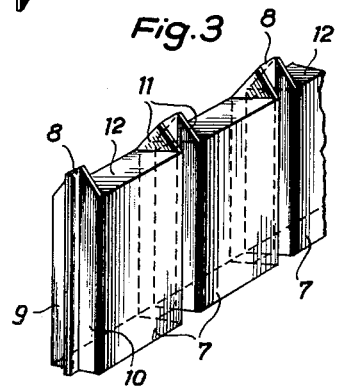
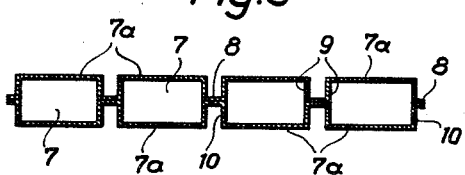
INVENTOR
Karl-Heinz Danielzig
by: Michael S. Striker
Attorney

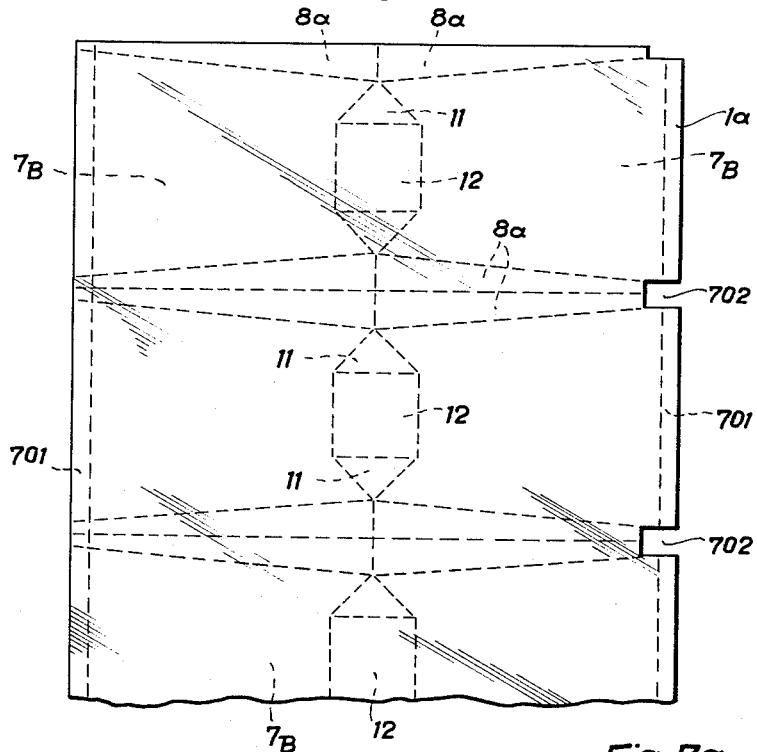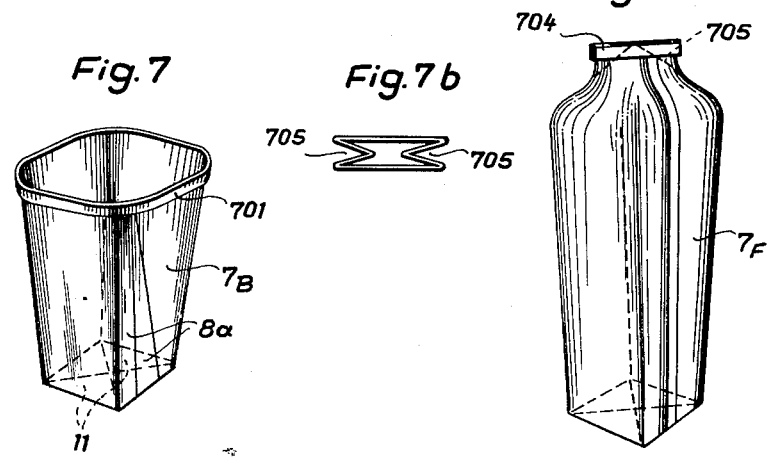

INVENTOR
Karl-Heinz Danielzig
by: Michael S. Striker
Attorney

July 3, 1962  KARL-HEINZ DANIELZIG  3,041,941
MANUFACTURE OF CONTAINERS OR THE LIKE
Filed July 23, 1958  12 Sheets-Sheet 6

INVENTOR
Karl-Heinz Danielzig
by: Michael S. Striker
Attorney

July 3, 1962 KARL-HEINZ DANIELZIG 3,041,941
MANUFACTURE OF CONTAINERS OR THE LIKE
Filed July 23, 1958 12 Sheets-Sheet 8

INVENTOR
Karl-Heinz Danielzig
by: Michael S. Striker
Attorney

July 3, 1962     KARL-HEINZ DANIELZIG     3,041,941
MANUFACTURE OF CONTAINERS OR THE LIKE
Filed July 23, 1958     12 Sheets-Sheet 11

INVENTOR
Karl-Heinz Danielzig
by: Michael S. Striker
Attorney

July 3, 1962  KARL-HEINZ DANIELZIG  3,041,941
MANUFACTURE OF CONTAINERS OR THE LIKE
Filed July 23, 1958  12 Sheets-Sheet 12
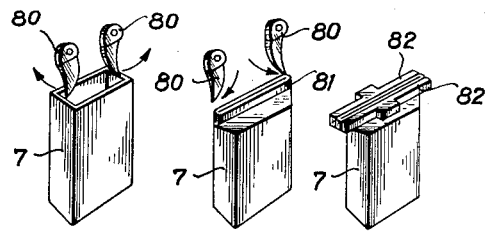
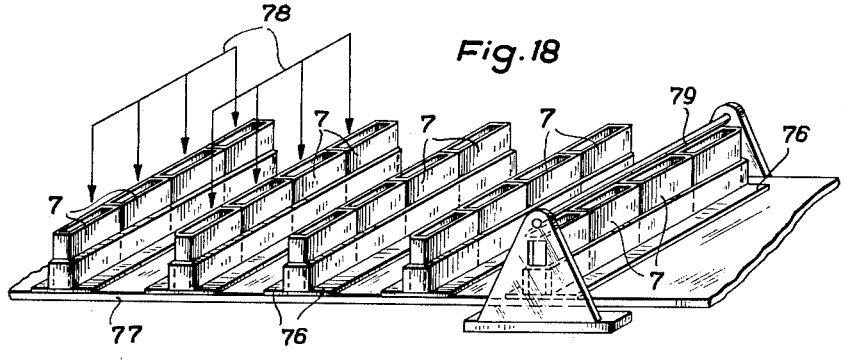
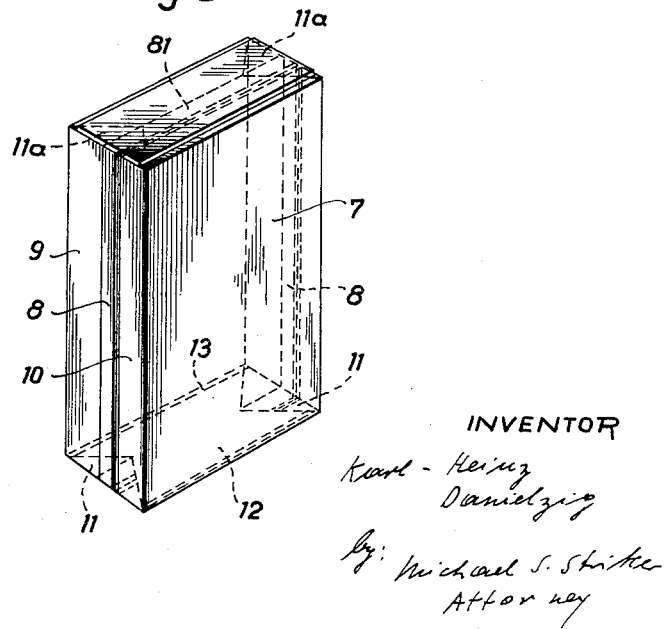
INVENTOR
Karl-Heinz Danielzig
By: Michael S. Striker
Attorney

United States Patent Office 3,041,941
Patented July 3, 1962

3,041,941
MANUFACTURE OF CONTAINERS OR THE LIKE
Karl-Heinz Danielzig, Darmstadt, Germany, assignor to Habra-Werk Wilhelm F. Ott, Darmstadt, Germany, a corporation of Germany
Filed July 23, 1958, Ser. No. 750,491
Claims priority, application Germany July 25, 1957
14 Claims. (Cl. 93—12)

The invention concerns a method and apparatus for producing containers of paper or the like in one operation.

It is the object of the present invention to provide a new method and apparatus for producing containers, such as e.g. bags, sacks, beakers, bottles or the like having an integral bottom. By the new method according to the invention containers are formed after a U-like folding of a starting web, coated on the internal surface with hot sealable material by compressing the two longitudinal sides of the web at spaced side wall sections intermediate supporting members or mandrels on which the containers are to be formed. Superimposed side wall sections are thus formed, and then joined by heat-sealing.

After dividing these containers by cutting through the superimposed walls, the sealed wall parts and bottom flaps are flattened, it is possible to apply separate bottom sheets or a bottom sheet extending over all containers.

The apparatus for carrying out the method in accordance with the invention comprises a plurality of supporting members or mandrels adjacently disposed at predetermined distances corresponding to the size and shape of the container, pressing members alternating with the supporting members, and bonding means preferably located in the pressing members. All these members are supported for movement along the web and are pulled together when the web is contracted by the action of the pressing members.

A circular arrangement of the working stations is preferred, including a turnable support carrying the supporting mandrel attached thereto, while pressing plates with lateral folding flaps, and also the pressing and welding members are disposed on the outside of a web fed to the supporting mandrels.

According to the invention there is obtained an automatic production of containers e.g. bags, beakers, bottles or the like of paper or the like with a high output and by means of a simple machine of a reliable structure. The containers may be produced directly from a flat paper web or the like.

Figure 8B:
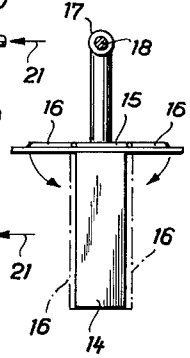
Figure 8C:
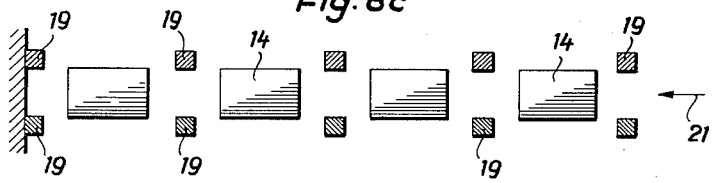
Figure 8D:
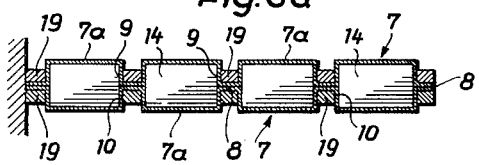
Figure 9:
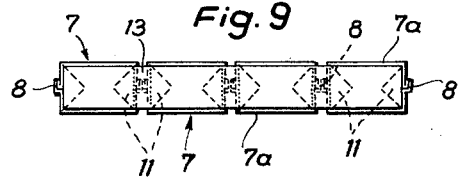
Figure 10:
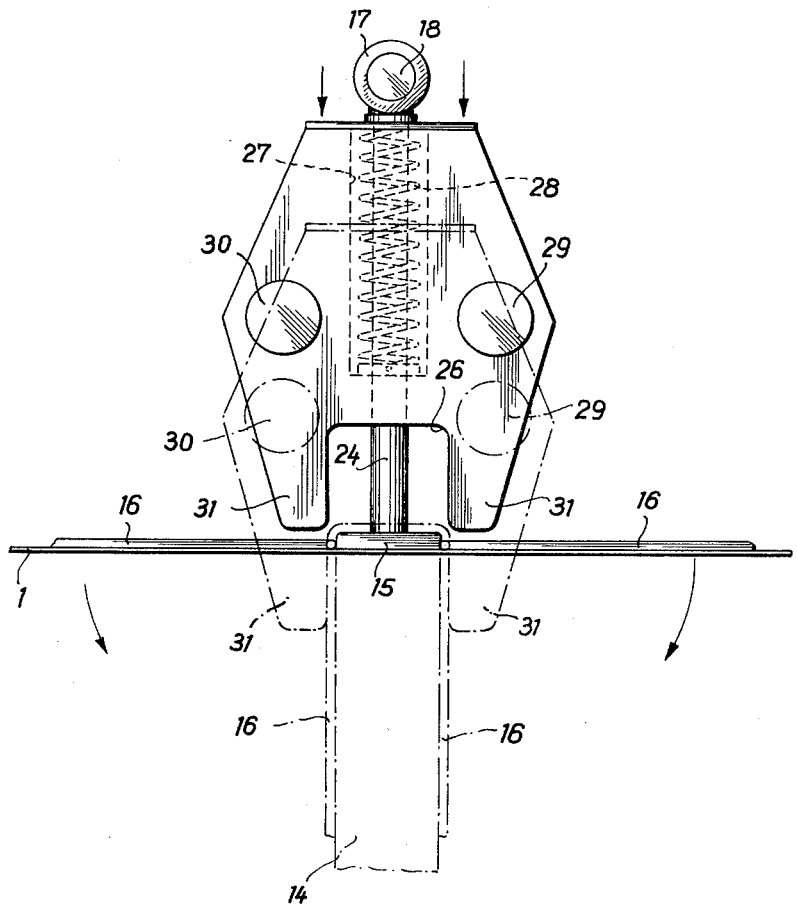
Figure 11:
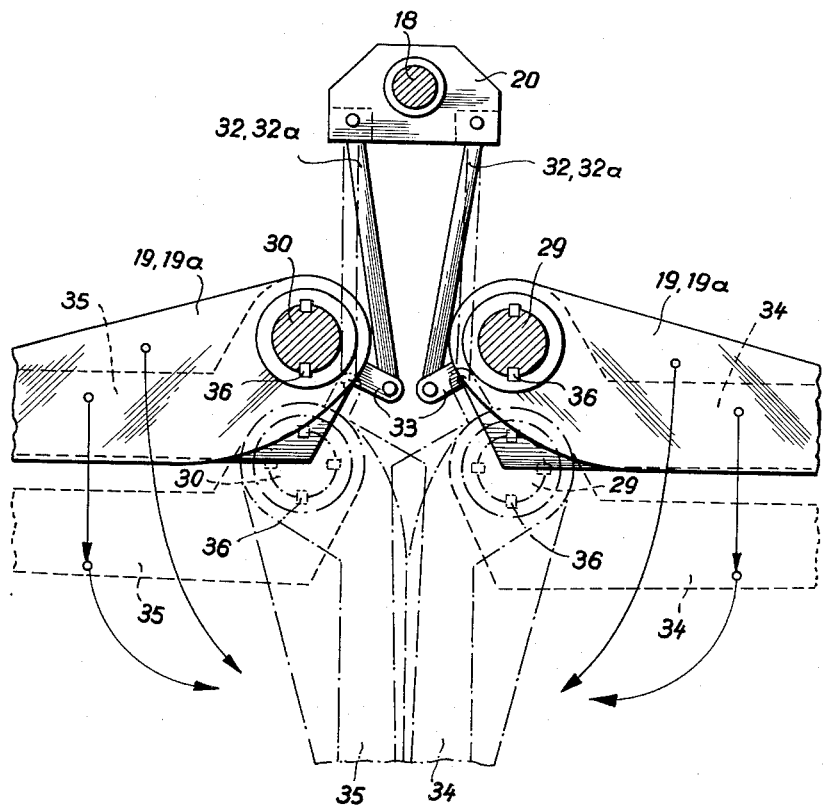
Figure 12:
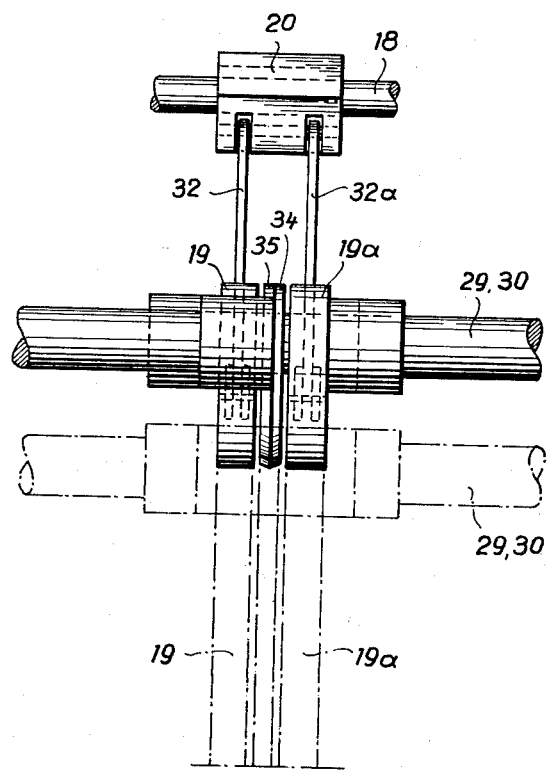
Figure 13:
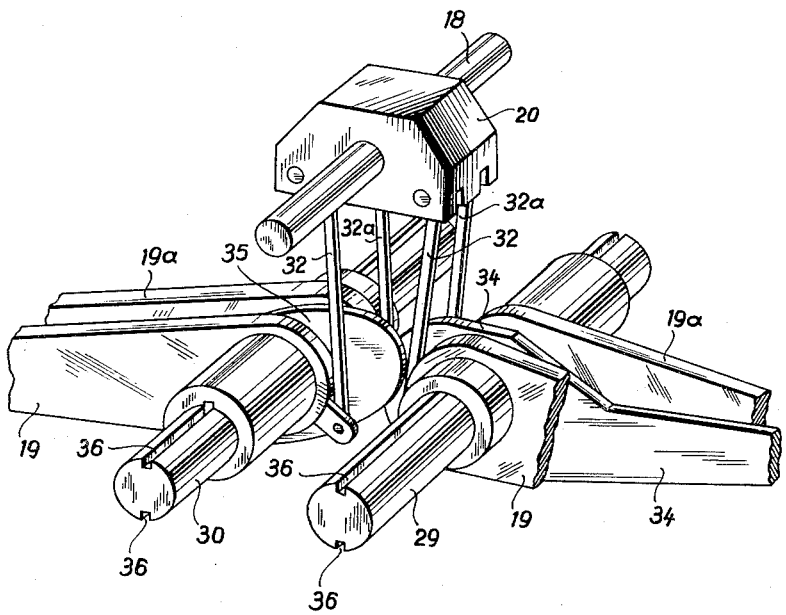
Figure 14:
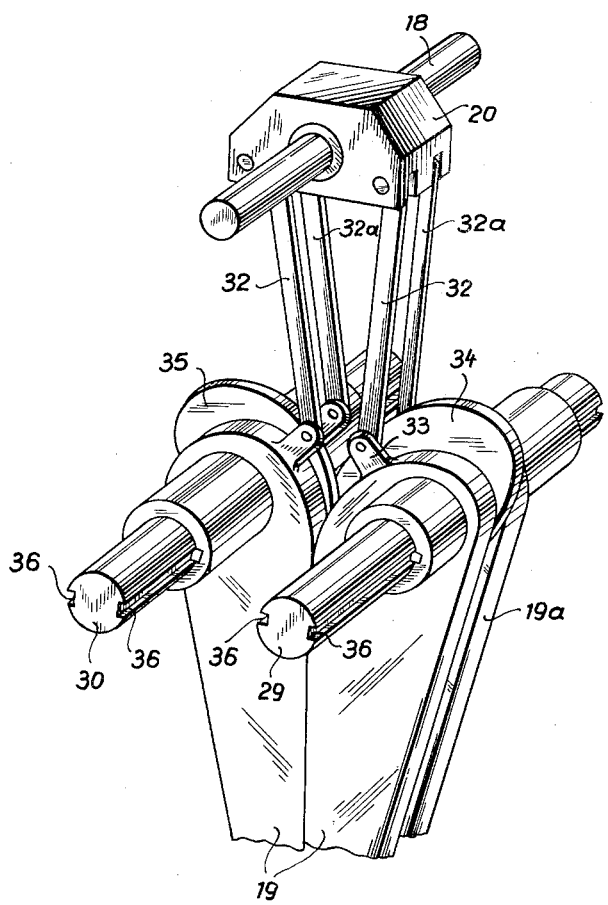
Figure 15:
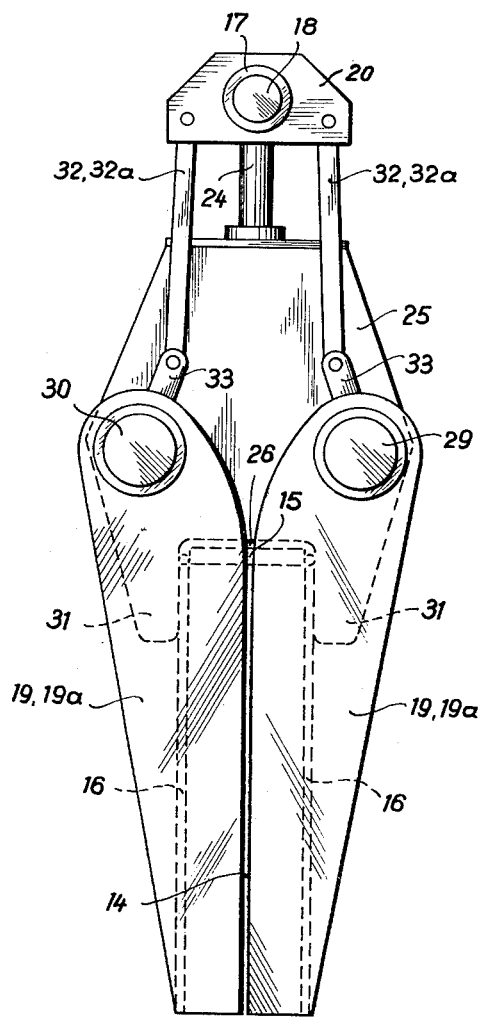
Figure 16:
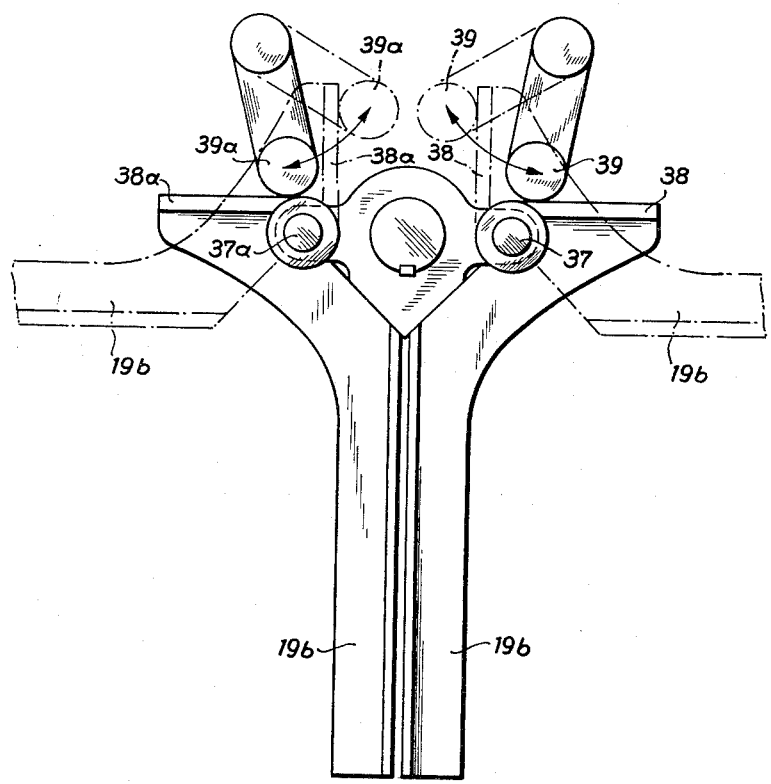
Figure 17:
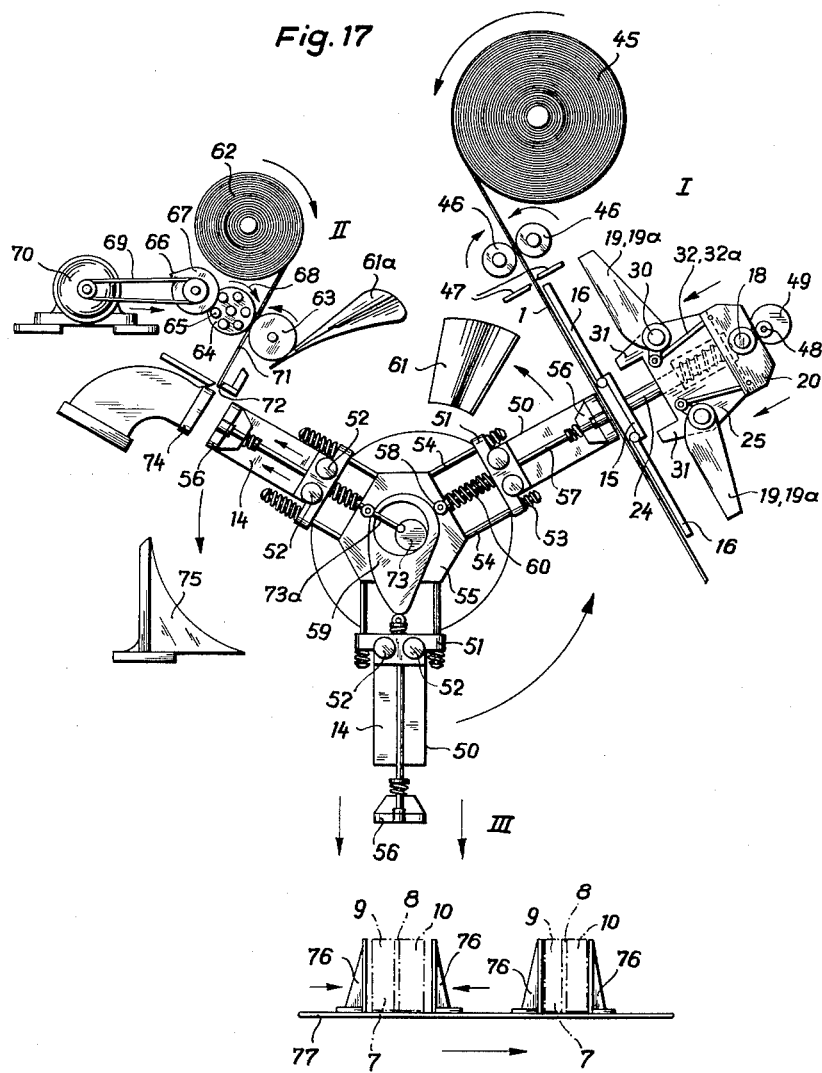

The invention will be described further, by way of example, with reference to the accompanying drawings, in which:

FIG. 1 is a plan view of a starting web;
FIG. 2 is a diagrammatic view of a U-shaped folded starting web in a first operational stage;
FIG. 3 is a diagrammatic perspective view of a completed series of containers;
FIG. 4 is a side elevation corresponding to FIG. 3;
FIG. 5 is a cross section of FIG. 4;
FIG. 6 is a plan view of a starting web for beakers;
FIG. 7 is a perspective view of a completed beaker;
FIG. 7a is a diagram of a filled bottle;
FIG. 7b is a diagram showing a folded bottle;
FIG. 8a is a diagrammatic side elevation of the principal components of the apparatus according to the invention in the starting position;
FIG. 8b is a cross section on the line VI—VI of FIG. 8a;
FIG. 8c is a diagrammatic plan view of FIG. 8a;
FIG. 8d is a diagrammatic plan view of FIG. 8a after the container parts have been folded;
FIG. 9 is a diagrammatic plan view of a container series provided with a bottom sheet;
FIG. 10 is a front elevation of the folding plates with operating means;
FIG. 11 is a front elevation of the pressing elements and cutting members;
FIG. 12 is a side elevation corresponding to FIG. 11;
FIG. 13 and 14 are diagrammatic perspective views of the pressing elements and cutting members;
FIG. 15 is a front elevation of the apparatus according to FIGS. 10 and 11;
FIG. 16 is a front view of further embodiment of pressing elements;
FIG. 17 is a diagrammatic front view of an apparatus according to the invention;
FIG. 18 is a diagrammatic perspective view of a filling and sealing device;
FIG. 19 is a diagrammatic perspective view of the closing operation of a bag;
FIG. 20 is a diagrammatic perspective view on an enlarged scale showing a completed filled and sealed bag.

For producing bags, sacks or the like, beakers, bottles, or other containers there is used for example paper, synthetic material, metal foil or other suitable web coated on one side with a hot sealable material or the like. Panels are separated or trimmed from a starting web, corresponding to the size desired and, for example, without machining any grooves therein or folding the web or the like, are fed to the convention. Such a starting web 1 is shown in FIG. 1 wherein the chain-dotted and broken lines shown on the drawing may be imagined to be nonexistent. The coating layer of synthetic material or the like is situated on the bottom of this starting web.

In the first operational stage the starting web is folded into U-shape as shown in FIG. 2, whereby the coating layer is situated on the inside of this U-shaped folded web. The width of the web bottom 2 corresponds to the width of a container bottom and the height of two longitudinal sides 3 and 4 corresponds to the height of a completed bag.

At predetermined intervals, as indicated by the arrows 5 this U-shaped structure is compressed at sections of the side walls 3 and 4. Thus is created a folded structure as shown in FIGS. 3 to 5 comprising a plurality of consecutive open container bodies 7 and longitudinal superimposed side wall sections 8 located therebetween. By contraction in the direction of the arrows 6 there are formed immediately adjacent to the superimposed section 8, transverse wall sections 9 and 10 of the container bodies, while there are simultaneously formed at the upper end upwardly projecting triangular folded flaps 11 which are directly adjacent to bottoms 12.

After dividing the longitudinal sections 8 between the container parts 7 individual containers are obtained, the bottom of which can be supplied in any manner with a bottom sheet.

In this way it is possible for several adjacently disposed e.g. up to 10 containers or even more to be produced depending upon the size, each bag having an integral i.e. undivided bottom. The width of the starting web 1 determines the number of adjacently disposed containers or bags or the like. The lines shown in FIG. 1 of the drawings are obtained when the folded web is opened out again. The lines include bag body walls 7a, longitudinal sections 8, bag walls 9 and 10, bag bottom 12 and flaps 11. A thicker material for the starting webs may, after cutting to shape, also to be scored or provided with folding lines in an additional operation, e.g. according to the lines shown in FIG. 1 of the drawing to facilitate the folding operation.

FIG. 6 shows a starting web for producing paper beakers, which for example have the shape shown in FIG. 7. The starting web, in dependence upon the thickness of the paper, may be provided either with scoring or folding lines or it may be fed to the machine in a smooth state.

In this starting shape the parts intended for the bottom 12 about which the U-shaped folding is effected are adjoined by the tubular walls $7_B$ which, with the longitudinal sealing seams 8a extended conically relative to the substantially square bottom 12, resulting in a conical tube of circular cross section. As previously described it is possible for a plurality of adjacently disposed beakers to be distributed over the width of the starting web.

The U-shaped folding is effected according to the width of the bottoms 12 and, by way of conically formed welding members, the longitudinal sections 8 between the beaker bodies are welded together in superimposed condition. To reinforce the beaker body, an edge 701 is formed at the top after the beaker has been folded. If necessary, it is possible to provide recesses 702 as that, at the upper end of the folded over edge the outwardly turned flaps can overlap in extension of the longitudinal sealing seams 8a. The thermoplastic heat-sealable coating is disposed in the inside of the beaker so that at the folded over edge 701 it faces outwards.

These beakers in which the beaker body extends upwardly and widening conically from a square bottom, may be made of comparatively thin paper which need not have the characteristic of cardboard. The triangular flaps 11 formed during the folding operation are also folded over against the bottom and the latter covered with a bottom sheet. Such beakers compared with cardboard beakers produced hitherto are inexpensive to manufacture. It is also possible for the beaker's body to be extended in an upward direction so that after it has been filled an upper closure can be provided.

If the tube walls $7_B$ are constructed so as to be very long in relation to the width, then it is also possible to produce bottle-like containers $7_F$, which after being filled on forming inner folds 705 (see FIG. 7b) may be sealed with an overlapping closure strip 704 (see FIG. 7a).

As shown in FIGS. 8a to 8c shaping mandrels or supporting members 14, in the size and shape of the individual containers, are used for producing bags, bottles, beakers or the like according to the above described method. Above each supporting member 14 there is a pressing plate 15 adapted to be vertically reciprocated. On either side of each pressing plate 15 there are hinged folding plates 16, by means of which the U-shaped folding of the starting web 1 is effected. The starting web 1 is situated between the supporting members 14 and the pressing plates 15 which latter are each suspended on longitudinally disposed bearing members 17, which are slidably mounted on a common shaft 18.

Between the shaping bodies 14 there are arranged pressing and welding members which, with bearings 20, may also be mounted on the common shaft 18. From the U-shaped folded starting web, container bodies are formed by moving together the supporting member 14, bearings 17 and 20 with the folding plates 15, 16 mounted thereon and the pressing and welding members 19 in the direction of the arrows 21. This movement to a closer spaced position (FIG. 8d) is effected each time the pressing and welding members 19 are brought together to a pressing position so that, at the end of the operation, the supporting members 14 and the pressing and welding members 19 are in the position shown in FIG. 8d. The bag bodies 7 with their walls 7a, 9, 10 and the upwardly projecting folded flaps 11 with the integral bottom situated on the top, are formed around the supporting members 14 and the longitudinal side wall sections 8 or 8a of the bag or beaker bodies are disposed between the pressing and welding members 19.

The longitudinal sections 8 or 8a may be interconnected in any manner between the pressing members 19. The most expedient method is a thermoplastic connection by selecting a thermoplastic inner coating on the starting web. The pressing and welding members 19 for this purpose are heated at the contacting edges in a suitable way, for as long as pressure is being exerted on the longitudinal sections 8 or 8a pressed therebetween. Due to the thermoplastic inner coating the longitudinal sections 8 or 8a are welded in by heat action.

When dividing the pressing and welding members 19 in the longitudinal direction thereof in such a manner that there is created a gap in the centre thereof for passing a cutting member through, it is possible for at the end of operation to divide the container approximately in the centre of the longitudinal sections 8 or 8a.

The bottom pressing plates 15 may be provided at the ends with shoulders or the like which correspond approximately to the size of the triangular corners 11 that, in combination with the pressing and welding members 19 which are widened in the region of the triangular corner the bottom corners 11 can also be welded by heating.

FIG. 9 shows how the completed container rows may be covered by way of a continuous bottom sheet 13 after folding over the longitudinal sealed edges 8, and the triangular-shaped flaps 11 against the bottom. This bottom sheet 13 may have perforations between each individual container whereby it is possible to separate the bottom sheet in the region of the perforation. It is however also possible to separate the containers by way of suitable cutting devices, or individual bottom sheets are cemented to the individual bags or beakers.

FIG. 10 shows an embodiment of the apparatus for carrying out the U-like folding operation. Herein the pressing plate 15 as already described, is fitted with folding plates 16 hingedly disposed on either side. Between the supporting member 14 and the pressing plate with the folding plates 16 fitted thereon, there is disposed the web 1 of paper or the like. The pressing plate 15 is mounted on a pressing ram 24, which extends into the bearing 17, which is mounted on the shaft 18. An operating member 25, which at the bottom has an open recess 26 and towards the top has a bore 27 adapted to receive a spring 28 is slidable on to the pressing ram 24 and slidably supports on either side shafts 29, 30 passing through suitable bores.

When pushing down the operating member 25 e.g. by way of the downwardly pressed shafts 29, 30 against the action of the spring 28, noses 31 press against the folding plates 16 and move them downwards through 90° into the positions shown by chain-dotted lines. The starting web 1, inserted between the supporting member 14 and the pressing plate 15, while simultaneously being retained on the supporting member 14 by way of the pressing plate 15, is folded over downwards by the folding plates 16 into U-shape as shown in FIG. 2. After or during this folding or even towards the end thereof, the pressing members 19, which are adaped for welding operations, become effective.

A practical embodiment of these pressing members 19 is shown in FIG. 11. Herein, these members 19 are rotatably mounted on the shafts 29 or 30. These shafts 29, 30 may, is necessary, simultaneously actuate the apparatus shown in FIG. 10, viz. the operating member 25. The pressing members are mounted on the bearing bodies 20 by way of connecting levers 32. It has proved advantageous for the connecting levers 32 to be mounted on brackets 33 fixed to the pressing members 19.

Preferably no integral pressing members are provided, but as shown in FIGS. 11 and 12, these pressing members are divided as shown in FIG. 12, in such a manner that two narrow pressing elements 19a are adjacently mounted leaving a space in between thereof. Each of these pressing elements 19a is connected to the bearing 20 by way of connecting levers 32, 32a. Between the pressing elements 19a there are disposed cutting members 34, 35, which are also mounted on the shafts 29, 30.

In FIG. 13 the pressing elements 19a, with the knives 34 and 35 situated therebetween, are shown diagrammatically in the initial position.

The shafts 18 on which the bearings 20 are mounted remain fixed. The shafts 29 and 30 are moved vertically up and down. Owing to the connecting levers 32, the pressing elements 19a swing downward when the shafts 29 and 30 are pushed upwards, through 90°, and, when they are constructed as welding members the welding operation commences (see FIG. 14 and positions shown in chain-dotted lines in FIGS. 11 and 12).

Simultaneously with this movement the cutting members 34 and 35 which are connected to the grooved shafts 29 and 30 for turning movement are also swung downwardly through 90° to a cutting position and cut the longitudinal side wall sections 8 or 8a of the bags or beakers in the centre. The grooves on which the cutting members 34, 35 are keyed are designated by the numeral 36.

The pressing elements 19a when constructed as welding means are heated in a suitable manner for sealing thermoplastically coated material. It has proved advantageous to provide on the edges of the pressing and welding elements 19a which are in contact with each other, separate heating ledges, whilst the main portion of pressing elements 19a is produced from material which is not heat conducting.

The pressing and welding elements 19a are swung over to the pressing position, after the operating member 25, shown in FIG. 10, by its nose 31, has moved the folding plates 16 downwards. If between the pressing and welding elements 19a there are provided the cutting members 34 and 35, then these are in the end position situated in the cutting positions; i.e., on termination of all these operations in the position as shown in FIG. 15, the individual containers, bags, beakers or the like are already separated.

From the above description, it will become apparent that shafts 18, 29, 30 constitute guide means for members 19, 25, 34, 35, permitting these members to move from a farther spaced position to a closed spaced position when the web is contracted by the pressing members 19. Supporting members 14 are supported in the same manner on guide means 52, as will be described with reference to FIG. 17 hereinafter.

FIG. 16 shows an alternative embodiment for pressing and welding members 19b which are rotatably disposed on shafts 37, 37a and are provided at the top with cam tracks 38, 38a cooperating with downwardly swingable control levers 39, 39a which abut thereagainst; it is possible, as shown by the drawing, for the pressing and welding members 19b to be moved relative to one another to a pressing position. If required, pairs of opposite cutting members may also be actuated in the above described manner.

According to the method in accordance with the invention and with the apparatus described, which are also subject to modification, it is possible for containers of any size and design to be produced in continuous operation starting from a flat starting web which is shaped and subsequently filled and also sealed. It is also possible for the apparatus for producing containers to be arranged in a circle and to be connected to the apparatus for filling and sealing.

FIG. 17 shows such an arrangement; the three principal stations I, II and III are arranged in a circle relatively offset at angles of 120°, it is however also possible for the positions to be spaced relative to one another by 90° or any other angle, possibly also unequal angles.

In the station I, which in FIG. 17 is located at the top right hand corner, the starting web is drawn from a paper roll 45 between the rollers 46 and cut to length by way of knives 47.

If the divided webs 1 are to be scored then folding or scoring devices are incorporated between the knives 47 and the position I. If necessary there may be incorporated a further cutting station, in order, for example, to form perforations in the starting web 1.

The prepared web 1 is disposed at station I under the pressing plate 15 and the lateral folding plates 16 connected thereto to render possible the U-shaped folding. Above this there is disposed the operating member 25 which, when pushed upwards with its projections 31, causes the folding plates 16 to swing down onto the sides of supporting members 14. The pressing and welding elements 19a turn about the shafts 29, 30. The pressing of the pressing plate 15 by the pressing ram 24 is effected by way of a cam disc 49 rotatable about the axis 48.

The U-shaped folding of the starting web is effected about the serially adjacent supporting members 14. These supporting members 14 may each comprise a housing part 50 matching the shape of the container, and a carrying body 51 laterally displaceably mounted on two guide shaft means 52. The carrying bodies 51 are supported on a central hexagonal rotary body 55 by way of bolts 54 spring-mounted at the top.

Towards the outside, the housings 50 are each fitted with a head piece 56, which by way of a shaft 57 guided in the supporting body 51, is controlled by rollers 58 running a cam disc 59. A spring 60 causes constant abutment of the roller 58 against the cam disc 59.

Between the station I and a further station II offset through 120° there are provided folding member 61 for folding over the sealed cut-off ledges 8 and other folding over members 61a are adapted to fold over the upper triangular flaps 11.

After folding over the sealed edges 8 the bags or the like fitted on the supporting members 14 arrive at the station II. Herein the bottom sheets 13 are cemented or sealed on over the folded over triangular flaps 11. The bottom sheets are drawn from a paper roll 62 by rollers 63, 64. The feed roll 64 has several operating pins 65 distributed over the periphery thereof which pins are engaged by the operating tooth 66 of an operating disc 67, and turn roll 64 intermittently in the direction of the arrow 68, in order to allow a strip 71 of constant width to be applied to the series of bags. The operating disc may be driven by way of a conveyor belt, such as for example a V-belt 69 from a source of power 70. The strips 71 advanced from the roller 62 may be divided by knives 72 and brought forward over the entire rows of bags above the heads 56. By a pressing ram 73a and a cam disc 73 the headpieces 56 are pushed up, whereby the strips 71 are finally pressed against the container bottoms and here firmly sealed when the head 56 or a counter pressure body 74 are designed to be heatable. If the strips 71 are to be cemented in position, then there must also be provided a cementing device.

There is also the possibility to incorporate a perforating machine in the continuous web 71 to perforate the continuous sheet between the individual bags. The strips 71 or the like are then separated in the region of the perforations (not shown) between the individual bags or the like.

When using a continuous non-perforated strip 71 to form a bottom sheet, the latter when advancing from station II to station II is divided between the bags or the like by way of a cutting device 75. In station II, the headpieces 56 are slid outwardly by the cam disc 59, whereby the containers are detached from the housings 50. The completed containers 7 arrive with their openings facing upwards between guides 76 which are displaceably mounted on a conveying device 77. By displacing these guides 76, e.g. the bags are firmly clamped between these guides.

The containers, for example bags, now arrive between these guides 76 in rows below filling devices 78, which are shown diagrammatically in three rows in FIG. 18. By way of these filling devices the bags can be filled successively with liquid, for example milk. The actuation of the filling devices in the individual rows and the advancing of the conveying device 77 with the rows of containers located thereon must be synchronised.

After the bags are filled they arrive at sealing devices 79 shown diagrammatically in FIG. 18. The sealing devices may, for example, comprise two expanding mandrels 80, by which an upper sealing ledge 81 is formed, which then, for example, is sealed by hot sealing jaws 82 (see FIG. 19).

A completed bag, for example for solid or also liquid or pulpy substances is illustrated in FIG. 20. At the upper and lower bottoms there are the triangular corner flaps 11, 11a. At the top there is the continuous corner hot-sealed ledge 81, while the lower bottom 12 an integral part. On the two narrow sides are shown the sealed cut-off ledges 8.

It is thus possible to produce any type of container for example, bags, sacks (FIG. 20), beakers (FIG. 7) or bottles (FIG. 7a) and so forth, and to use them for solid, powdery, granular, liquid, semi-liquid, semi-solid, porous substances or bodies of any other nature.

What I claim is:

1. In an apparatus for simultaneously making a plurality of containers, in combination, a plurality of pairs of opposite pressing members, the individual pressing members of each pair being movable in one direction toward and away from each other between a spread position and a pressing position tending to abut each other; elongated guide means extending in another direction for supporting said pairs of pressure members for movement along the length of said guide means between an initial position in which adjacent pairs of pressure members are spaced farther from each other and a final position in which adjacent pairs of pressure members are spaced more closely to each other in said other direction; a plurality of supporting means adapted to support an elongated channel-shaped web and mounted for movement in direction of said guide means and spaced intermediate adjacent pairs of pressure members; and operating means acting on said pressing members for effecting movement of said pressing members of each pair from said spread position to said pressing position in which spaced unsupported sections of said web are superimposed and placed into contact with each other while the web contracts and simultaneously moves said pairs of pressing members along said guide means from said initial position to said final position while said pressing members of each pair move along paths slanted to each other and to said directions whereby container blanks are formed in said web between said superimposed sections.

2. In an apparatus for simultaneously making a plurality of containers out of a U-shaped web, in combination, a plurality of pairs of opposite pressing members, the members of each pair being movable toward and away from each other between a retracted position and a pressing position; elongated guide means for supporting said pairs of pressing members for movement along the length of said guide means between a farther spaced position and a closer spaced position; a plurality of supporting members spaced in direction of said guide means for supporting an elongated channel-shaped web having side walls movable in direction of said guide means, and between said pressing members of said pairs of pressing members, said supporting members alternating with said pairs of pressing members along the length of said guide means so that said pressing members in said pressing position are located intermediate adjacent supporting members, said supporting members being supported on said guide means for movement along said guide means between a farther spaced position and a closer spaced position; and operating means for moving said pressing members of said pairs of pressing members in said farther spaced position toward said pressing position in a direction transverse to the web along paths inclined to the longitudinal direction of said guide means for pressing spaced sections of the side walls toward each other whereby transverse walls are formed in the web adjacent said supporting members and the web is shortened while said pairs of pressing members and said supporting members move along said guide means to said closer spaced position corresponding to the shortening of the web by said transverse walls until said pressing members of all pairs of pressing members arrive in said pressing position and press said spaced sections of said side walls into superimposed positions.

3. An apparatus as set forth in claim 2 wherein said supporting members are substantially prismatic mandrels having side faces adapted to abut the inside of sections of the side walls of said web and transverse faces for forming said transverse walls of said web, said side faces and transverse faces extending perpendicular to each other, and said pressing members of each pair of pressing members moving along said transverse faces of adjacent supporting members during movement between said spread and pressing positions.

4. In an apparatus for simultaneously making a plurality of containers out of a U-shaped web, in combination, a plurality of pairs of opposite pressing members, the members of each pair being movable toward and away from each other between a spread position and a pressing position, each pressing member including two pressing elements spaced from each other; a plurality of pairs of opposite cutting members, each cutting member being located between two pressing elements of a pressing member, opposite cutting members being movable toward and away from each other between a retracted position and a cutting position; elongated guide means for supporting said pairs of pressing members and said pairs of cutting members for movement along the length of said guide means between a farther spaced position and a closer spaced position; a plurality of supporting members spaced in direction of said guide means for supporting an elongated U-shaped web having side walls and a bottom wall for movement in direction of said guide means and located between said pressing members of said pairs of pressing members, said supporting members alternating with said pairs of pressing members along the length of said guide means so that said pressing members in said pressing position are located intermediate adjacent supporting members, said supporting members being supported on said guide means for movement along said guide means between a farther spaced position and a closer spaced position; and operating means for moving said pressing members of said pairs of pressing members in said farther spaced position toward said pressing position in a direction transverse to the web along paths inclined to the longitudinal direction of said guide means for pressing spaced sections of the side walls toward each other whereby transverse walls are formed in the web adjacent said supporting members and the web is shortened while said pairs of pressing members and said supporting members move along said guide means to said closer spaced position corresponding to the shortening of the web by said transverse walls until said pressing members of all pairs of pressing members arrive in said pressing position and press said spaced sections of said side walls into superimposed positions, whereupon said operating means moving said cutting members to said cutting position in a timed sequence with the movement of said pressing members so that said cutting members cut said superimposed sections.

5. An apparatus as set forth in claim 4 wherein said pressing members include means for bonding said superimposed sections to each other.

6. An apparatus as set forth in claim 5 wherein said web is at least partly coated with a heat-sealable material, and wherein said means for bonding are means for heat-sealing the superimposed sections to each other.

7. In an apparatus for simultaneously making a plurality of containers out of a U-shaped web, in combination, a plurality of pairs of opposite pressing members, the members of each pair being movable toward and away from each other between a retracted position and a pressing position, each pressing member including two pressing elements spaced from each other; a plurality of pairs of opposite cutting members, each cutting member being located between two pressing elements of a pressing member, opposite cutting members being movable toward and away from each other between a retracted position and a cutting position; a pair of guide shafts for supporting said pairs of pressing members and said pairs of cutting members for movement in axial direction between a farther spaced position and a closer spaced position and for turning movement between said retracted positions and said pressing and cutting positions, respectively; a plurality of supporting members spaced in direction of said guide means for supporting an elongated U-shaped web having side walls for movement in direction of said guide means and located between said pressing members of said pairs of pressing members, said supporting members alternating with said pairs of pressing members along the length of said guide means so that said pressing members in said pressing position are located intermediate adjacent supporting members; guide means for supporting said supporting members for movement parallel to said guide shafts between a farther spaced position and a closer spaced position; and operating means for moving said pressing members of said pairs of pressing members in said farther spaced position toward said pressing position in a direction transverse to the web along paths inclined to the longitudinal direction of said guide means for pressing spaced sections of the side walls toward each other whereby transverse walls are formed in the web adjacent said supporting members and the web is shortened while said pairs of pressing members and said supporting members move along said guide means to said closer spaced position corresponding to the shortening of the web by said transverse walls until said pressing members of all pairs of pressing members arrive in said pressing position and press said spaced sections of said side walls into superimposed positions, said operating mean moving said cutting members to said cutting position in a timed sequence with the movement of said pressing members so that said cutting members cut said superimposed sections.

8. An apparatus as set forth in claim 7 wherein said pressing members are longer than said supporting members so as to extend beyond the side walls of said web for pressing sections of the bottom wall of said U-shaped web into superimposed positions.

9. In an apparatus for simultaneously making a plurality of containers out of a web, in combination, a plurality of pairs of opposite pressing members, the pressing members of each pair being movable toward and away from each other between a spread position and a pressing position; a plurality of opposite folding plates, the folding plates of each pair being turnable toward and away from each other between a retracted position and a folding position located opposite each other; a plurality of supporting members located between and cooperating with each pair of folding plates in said folding position, the pairs of folding plates and supporting members alternating with said pairs of pressing members, said supporting members having bottom faces for supporting an elongated web; elongated guide means extending in the longitudinal direction of said web and supporting said pairs of pressing members, said pairs of folding plates, and said supporting members movable along the length of said guide means, and also supporting said pressing members and folding plates for movement toward and away from each other; and operating means for moving said folding plates and said pressing members in a timed sequence toward each other to said folding and pressing positions, respectively, so that said folding members form a U-shaped web on said supporting members and so that said pressing members press spaced unsupported sections of the side walls and of the bottom wall of the U-shaped web toward each other whereby transverse walls are formed in the web on said supporting members and the web is shortened to draw said pairs of pressing members and of folding plates and said supporting members along said guide means to more closely spaced positions until said pressing members of all pairs of pressing members arrive in said pressing position and press said spaced unsupported sections of said side walls into superimposed positions.

10. An apparatus as set forth in claim 9 wherein said guide means include a first guide means for guiding said supporting members, a second guide means for guiding said pressing members, and a third guide means for guiding said folding plates.

11. In an apparatus for simultaneously making a plurality of containers out of a web, in combination, a plurality of pairs of opposite pressing members, the pressing members of each pair being movable toward and away from each other between a retracted position and a pressing position, each of said pressing members including two pressing elements spaced from each other; a pair of opposite cutting members, each cutting member located between two presser elements, opposite cutting members being movable toward and away from each other to and from a cutting position; a plurality of opposite folding plates, the folding plates of each pair being turnable toward and away from each other between a retracted position and a folding position located opposite each other; a plurality of supporting members located between and cooperating with each pair of folding plates in said folding position, the pairs of folding plates and supporting members alternating with said pairs of pressing members, said supporting members having bottom faces for supporting an elongated web; elongated guide means extending in the longitudinal direction of said web and supporting said pairs of pressing members, said pairs of folding plates, said cutting members, and said supporting members movable along the length of said guide means, and also supporting said pressing members, folding plates, and cutting members for movement toward and away from each other; and operating means for moving said folding plates and said pressing members in a timed sequence toward each other to said folding and pressing positions, respectively, so that said folding members form a U-shaped web of said supporting members and so that said pressing members press spaced unsupported sections of the side walls and of the bottom wall of the U-shaped web toward each other whereby transverse walls are formed in the web on said supporting members and the web is shortened to draw said pairs of pressing members and of folding plates, and said supporting members move along said guide means to more closely spaced positions until said pressing members of all pairs of pressing members arrive in said pressing position and press said spaced unsupported sections of said side walls into superimposed positions, said operating means moving said cutting members to said cutting position in a timed sequence with said pressing members for cutting the superimposed sections of the web.

12. An apparatus as set forth in claim 11 wherein said guide means includes a pair of guide shafts supporting said pressing members and cutting members for axial movement and turning movement.

13. An apparatus as set forth in claim 12 wherein said operating means include an operating member for moving said folding plates to said folding position, said operating member slidably receiving said guide shafts.

14. An apparatus as set forth in claim 13 and including a press plate between each pair of folding plates, said press plates being movable to and from an operative position for forming the bottom of the U-shaped web, and turnably supporting said folding plates.

References Cited in the file of this patent

UNITED STATES PATENTS

| | | | |
|---|---|---|---|
| 2,224,779 | Chalmers et al. | Dec. 10, 1940 |
| 2,269,532 | Howard | Jan. 13, 1942 |
| 2,309,209 | Palmer | Jan. 26, 1943 |
| 2,445,757 | Belcher | July 27, 1948 |
| 2,691,259 | Weckesser | Oct. 12, 1954 |
| 2,718,105 | Ferguson | Sept. 20, 1955 |
| 2,749,966 | Roetger | June 12, 1956 |
| 2,881,574 | Wardell | Apr. 14, 1959 |